R. H. RICE.
CENTRIFUGAL AIR COMPRESSOR.
APPLICATION FILED JULY 16, 1908.

1,087,401.

Patented Feb. 17, 1914.
5 SHEETS—SHEET 1.

Witnesses:

Inventor,
Richard H. Rice,
By Atty.

R. H. RICE.
CENTRIFUGAL AIR COMPRESSOR.
APPLICATION FILED JULY 16, 1908.

1,087,401.

Patented Feb. 17, 1914.

5 SHEETS—SHEET 2.

Witnesses:

Inventor,
Richard H. Rice,
By
Att'y.

R. H. RICE.
CENTRIFUGAL AIR COMPRESSOR.
APPLICATION FILED JULY 16, 1908.

1,087,401.

Patented Feb. 17, 1914.
5 SHEETS—SHEET 3.

Witnesses:
Marcus L. Byng.
J. Ellis Glen

Inventor,
Richard H. Rice,
By Albert G. Davis
Att'y.

R. H. RICE.
CENTRIFUGAL AIR COMPRESSOR.
APPLICATION FILED JULY 16, 1908.
1,087,401.
Patented Feb. 17, 1914.
5 SHEETS—SHEET 4.
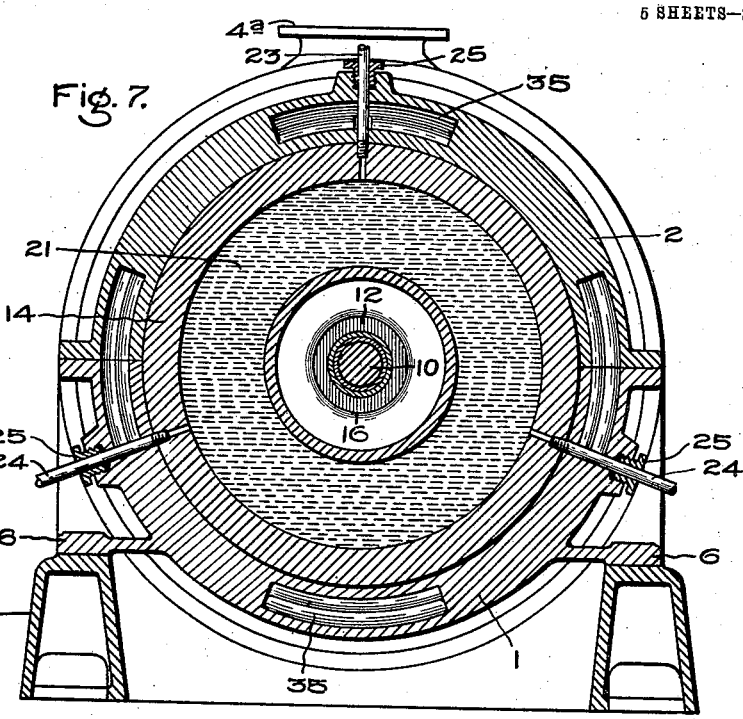
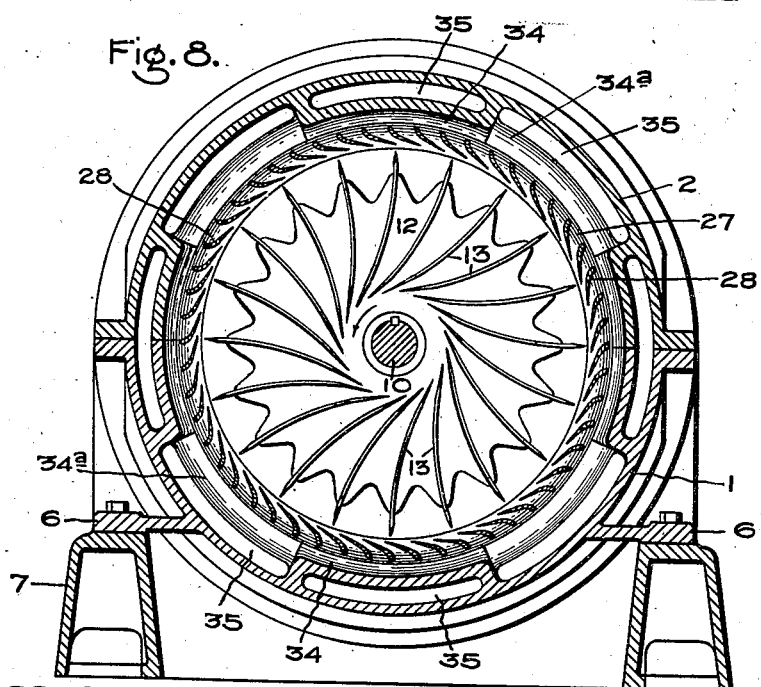
Witnesses:
Marcus L Byng.
J. Ellis Glen
Inventor,
Richard H. Rice,
By
Att'y.

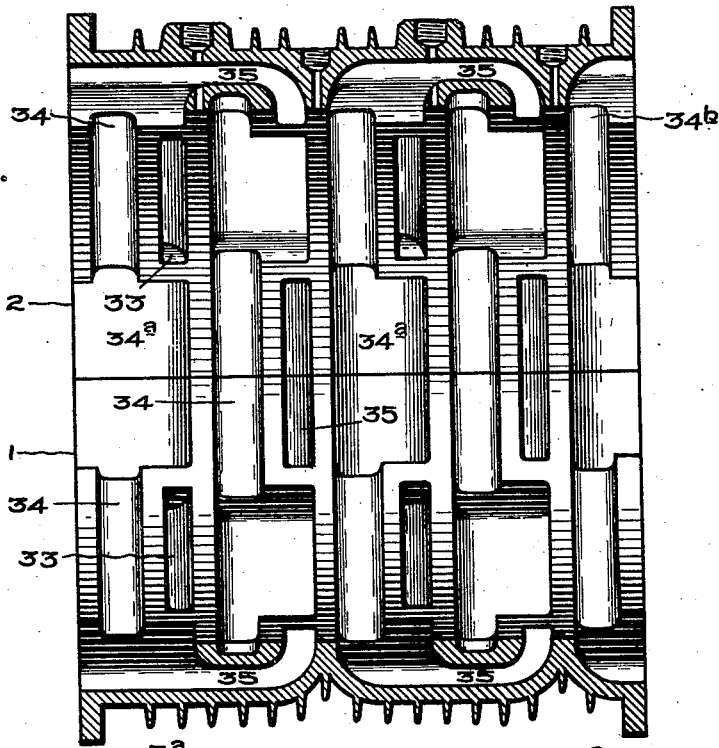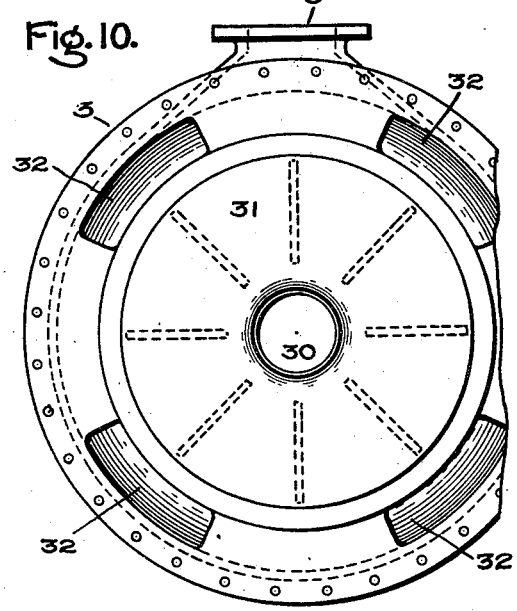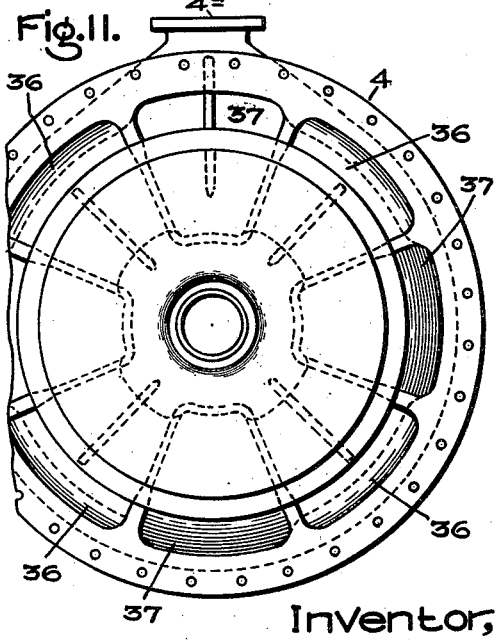

UNITED STATES PATENT OFFICE.

RICHARD H. RICE, OF LYNN, MASSACHUSETTS, ASSIGNOR TO GENERAL ELECTRIC COMPANY, A CORPORATION OF NEW YORK.

CENTRIFUGAL AIR-COMPRESSOR.

1,087,401.            Specification of Letters Patent.      Patented Feb. 17, 1914.

Application filed July 16, 1908. Serial No. 443,773.

*To all whom it may concern:*

Be it known that I, RICHARD H. RICE, a citizen of the United States, residing at Lynn, in the county of Essex, State of Massachusetts, have invented certain new and useful Improvements in Centrifugal Air-Compressors, of which the following is a specification.

The present invention has for its object to provide a centrifugal air compressor of improved construction.

Figure 1:
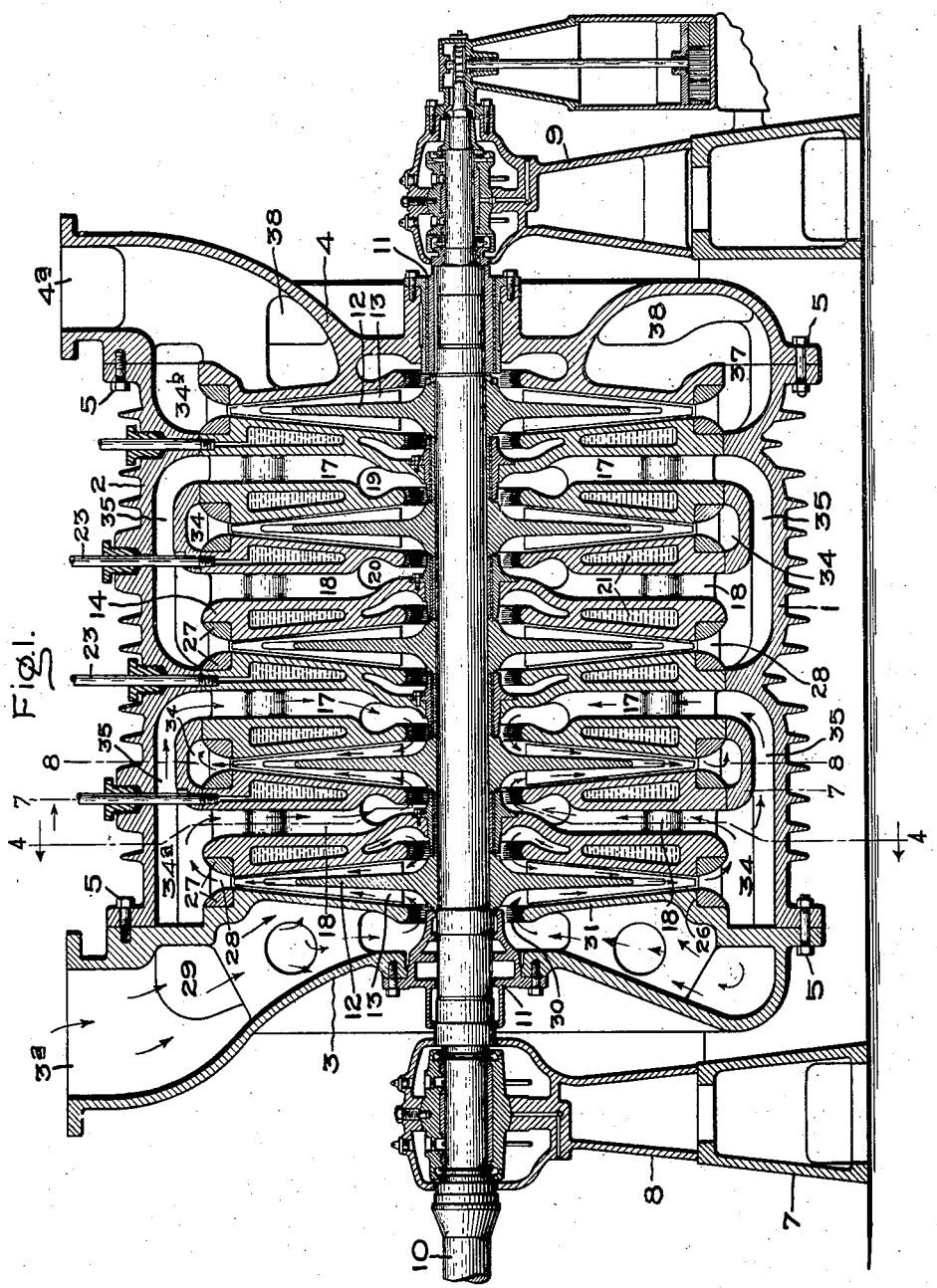
Figure 2:
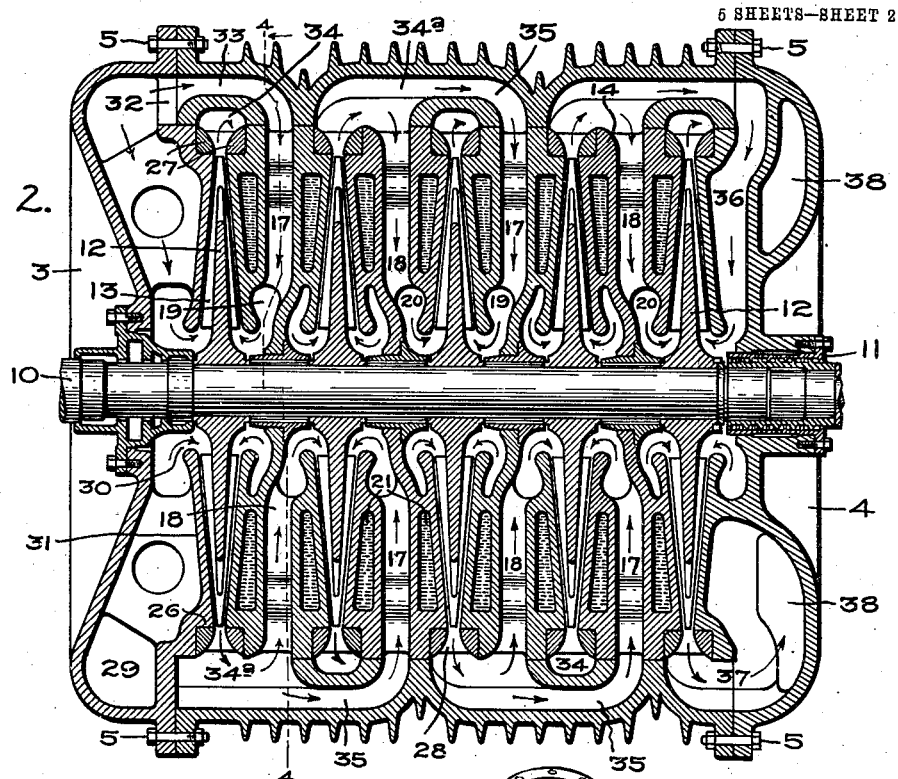
Figure 3:
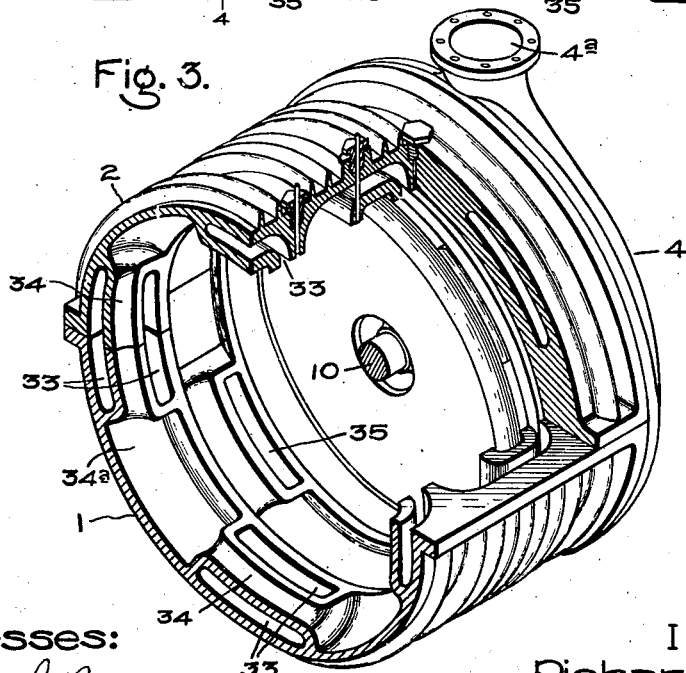
Figure 4:
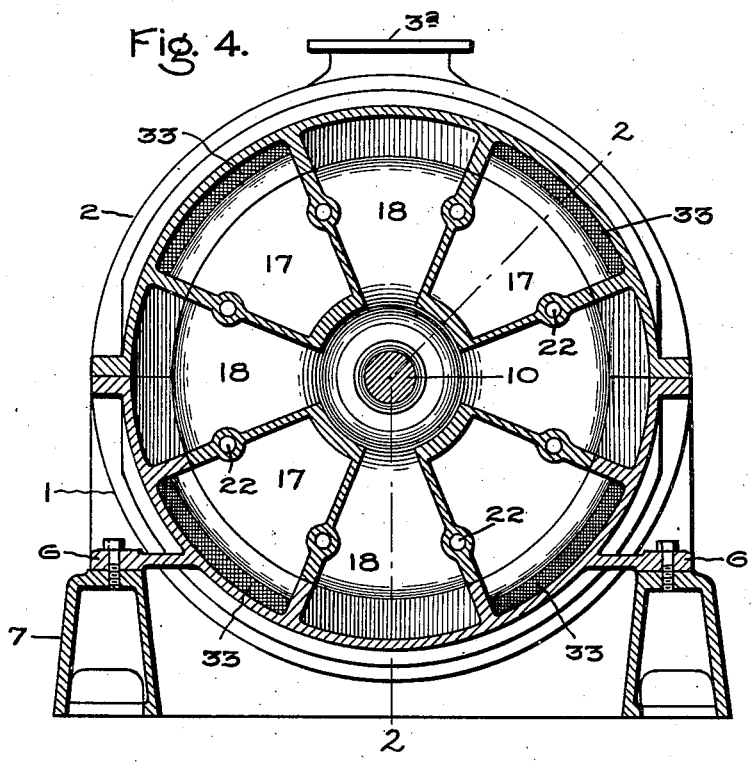
Figure 5:
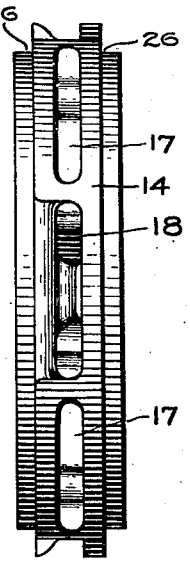
Figure 6:
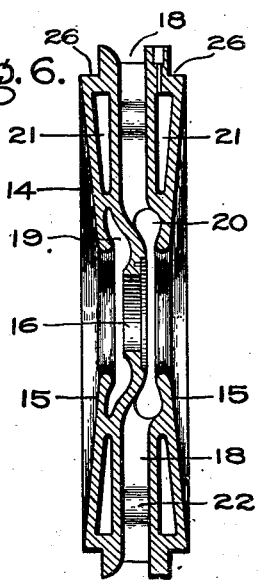

In the accompanying drawings, which illustrate one of the embodiments of my invention, Figure 1 is an axial section of a multistage air compressor; Fig. 2 is an axial section taken on line 2—2 of Fig. 4 and illustrates particularly the arrangement of parts whereby fluid discharged by one impeller is conveyed to opposite sides of the next impeller of higher pressure; Fig. 3 is a perspective view of the casing partly broken away to show the passages therein for conveying fluid from the points of discharge of the impellers to the passages in the diaphragms; Fig. 4 is a cross-section of the compressor taken on line 4—4 of Fig. 2, and shows particularly the passages in one of the diaphragms; Fig. 5 is a view in side elevation of one of the diaphragms for dividing the compressor into stages; Fig. 6 is a diametrical section of the same; Fig. 7 is a cross-section taken on line 7—7 of Fig. 1 and shows particularly a cooling chamber in one of the diaphragms with means for supplying cooling fluid thereto; Fig. 8 is a section taken on line 8—8 of Fig. 1 and shows the relation of one of the impellers and the discharge vanes of its annular nozzle; Fig. 9 is a longitudinal section of the casing and shows the various passages and ports therein which receive fluid from one impeller and convey it to the passages in the diaphragms; Fig. 10 is an elevation viewed from the inside of the head on the admission end of the compressor; and Fig. 11 is a similar view of the head at the discharge end of the compressor.

1 indicates the lower half of the casing, and 2 the upper, the plane of division being axial, see Figs. 4, 7, 8, and 9. The casing is provided with an inlet head 3 and an outlet or discharge head 4. The parts of the casing and heads are flanged and secured together by the bolts 5. The lower half of the casing is provided with projections or feet 6 that rest on and are supported by the bed-plate 7. In building the casing the adjacent surfaces of the halves thereof are machined and the holes for the bolts 5 tapped, after which the two parts are fastened together and the interior of the casing bored to the required diameter. It is to be noted that the inner wall or surface of the casing is cylindrical in so far as the machined surfaces are concerned, hence the boring operation is very simple. There are passages or conduits for conveying air to the impellers, which open into the cylindrical bore, as will appear later, but these are not finished.

Mounted on the bed-plate at opposite ends are bearings 8 and 9, which support the shaft 10. Where the shaft passes through the inlet and outlet heads, packings 11 are provided of any approved construction to prevent air from leaking outwardly. Secured to the shaft and rotating with it are as many impellers 12 as there are stages in the compressor. Each of these impellers is provided with two sets of blades or vanes 13, one on each side of the main body. The blades may be integral with said body, but preferably they consist of separate pieces of sheet metal cast into the body in such manner that they project from opposite sides thereof; thus one piece of metal forms two blades. The cross-sectional areas of the various passages or spaces between the impeller blades and those in the nozzles and casing decrease somewhat from the inlet to the exhaust to compensate for the decreased volume of the air or other fluid undergoing compression.

Located between each two of the impellers is a diaphragm 14, shown in edge elevation and in section in Figs. 5 and 6. It will be noted that the diaphragm is a thick circular disk having dished faces 15, and a central packed aperture 16 for the shaft to pass through. In the body of the diaphragm is a plurality of radial passages 17, 18, Fig. 4, the drawings showing eight, for example. Concentric with the central opening are two annular chambers 19, 20, Fig. 6, which open radially inward. The chamber 19 communicates with the radial passages 17, and the chamber 20 with the passages 18, said passages alternating with each other as shown, In the body of the diaphragm are one or more closed annular chambers 21, Figs. 1, 6 and 7, lying on each side of the passages 17, 18, and connected at intervals by passageways 22, Fig. 4. Water or other cooling fluid is admitted to the chambers 21 by a suitably packed pipe 23 and discharged by one or more pipes 24. It is to be noted that each of these pipes is threaded into the diaphragm which renders it unnecessary to make any packed joints between the periphery of the diaphragm and the inner surface of the casing. The packing 25 around each pipe where it passes through the casing prevents the escape of the fluid undergoing compression. The periphery of each diaphragm is provided with two oppositely disposed annular shoulders 26. These shoulders serve to support and center the annular nozzles that surround the impellers, receive the fluid discharged therefrom and reduce its velocity and at the same time increase its density. Each nozzle comprises two ring-like portions 27, which rest on the shoulders, and the space between them is divided into passages by the partitions 28, best shown in Fig. 8. These partitions receive and direct the fluid as it leaves the impeller in a tangential direction with relatively high velocity and under a certain pressure due to centrifugal action. The passages diverge from the inlet to the exhaust by an amount sufficient to reduce the velocity of the fluid undergoing compression and increase its density before discharging it into the chamber which surrounds the nozzles and is formed in the casing proper. By actual tests I have demonstrated the fact that the efficiency of my improved compressor is improved by using the type of nozzle described.

Fluid to be compressed enters by the inlet 3a and fills the annular supply chamber 29, from which it flows, as indicated by the arrows, Fig. 1, to the left-hand side of the first-stage impeller through a central opening 30 in the inner wall 31 of said chamber, concentric with the shaft. It also flows through openings or ports 32, Figs. 2 and 10 in said wall 31 near the periphery of said chamber and enters registering ducts 33 formed in the casing and running lengthwise thereof. In the drawings there are four equidistant ports 32 and four corresponding ducts 33, but this number may be varied at pleasure. The ducts 33 conduct the air to the radial passages 17 in the first or left-hand diaphragm 14 in Figs. 1 and 2, through which it flows into the concentric chamber 19 and issues thence into the impeller chamber at the bases or inner ends of the vanes. The centrifugal action throws the air from the periphery of the impeller out through the nozzles into an annular or circumferential receiver 34 formed in the inside of the casing. The ducts 33 pass around outside of this receiver, as shown in Fig. 2.

The receiver 34 has four equidistant enlargements 34a alternating with the ducts 33 and extending into the same radial plane therewith, as shown in Figs. 1, 2, 3 and 9, where they connect with the radial passages 18 in the same diaphragm as before. Through these passages the air flows into the chamber 20, from which it is delivered to the left-hand side of the second impeller, as shown in Figs. 1 and 2. The air also escapes from the enlargements 34a through ducts 35, which pass outside of the receiver 34 of said second impeller and therefore around the periphery of said impeller and deliver the air to the radial passages 17 of the second diaphragm, by which said air is delivered to the right-hand side of the second impeller. In order to avoid skewing the ducts 35, the passages 17 in the second diaphragm are located in the same longitudinal plane as the passages 18 in the first diaphragm. The succeeding diaphragms and impellers are similarly arranged, the air forced by each impeller into its receiver being led thence through passages in the casing and the diaphragms to both sides of the next impeller, until it reaches the last receiver but one, from which it passes into the radial passages 18 of the right-hand diaphragm and also into passages 36, Fig. 2 in the head 4, leading to the right-hand side of the final impeller. From the last or right-hand receiver 34b the air flows through ports 37 to the annular chamber 38 in the head 4, whence it is delivered through the outlet 4a.

It will be observed that the diaphragms and nozzles are circular, and that when assembled on the shaft with the intervening impellers they form a cylindrical body which fits snugly into the cylindrically-machined casing. This mode of construction facilitates the making of the parts and the assembling of the machine.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is

1. A centrifugal air compressor comprising a casing having a cylindrical bore, a plurality of rotatable impellers, each having a central web and blades on opposite sides thereof which receive fluid independently, an annular nozzle for each impeller which converts velocity of the fluid into pressure, diaphragms between the impellers provided with passages arranged in substantially the same plane, and means coöperating with said passages for leading the air from each nozzle simultaneously to both sides of the next impeller.

2. A centrifugal air compressor comprising a casing having a cylindrical bore, a plurality of rotatable impellers each having a central web and blades on opposite sides thereof which receive fluid independently, an annular nozzle for each impeller which converts velocity of fluid into pressure, diaphragms between the impellers provided with passages extending from their periphery toward the center and arranged in substantially the same plane, and passages for leading air successively to all the impellers from the nozzle surrounding one to and through said passages to both sides of the center of the next.

3. A centrifugal air compressor comprising a plurality of rotatable impellers, a shaft therefor, diaphragms between the impellers provided with passages angularly arranged with respect to each other, an annular receiving chamber for each impeller, circumferentially arranged axial ducts connected in parallel that coöperate with said passages to receive air from the chambers and conduct it inward to the center of the next impeller on one side thereof, and also around the periphery of each impeller on the outside of its receiving chamber and then inward to its center on the other side thereof, a casing, and an inlet and an outlet for said casing.

4. A centrifugal air compressor comprising a plurality of rotatable impellers, and diaphragms between each two impellers containing alternating sets of passages arranged in substantially the same plane, each impeller receiving air at its center from passages in the diaphragms which are located on opposite sides of the impeller.

5. A centrifugal air compressor comprising a plurality of rotatable impellers, diaphragms containing passages arranged substantially in the same plane which lead alternately to impellers on opposite sides of said diaphragms, and nozzles for reducing the velocity of the air which are supported by adjacent diaphragms.

6. A centrifugal air compressor comprising a casing having an inlet and a discharge conduit, a plurality of rotatable impellers, and diaphragms between the impellers containing central annular chambers opening in opposite directions and passages carrying fluid at different pressures and communicating alternately with said chambers, said passages being arranged substantially in the same plane transverse to the axis of the diaphram.

7. A centrifugal air compressor, comprising a plurality of rotatable impellers, and diaphragms containing passages arranged substantially in the central planes of said diaphragms which lead alternately to impellers on opposite sides of said diaphragms, and one or more inclosed annular cooling chambers.

8. A diaphragm for use in a centrifugal air compressor having a plurality of impellers, consisting of a thick annular disk having dished faces and shouldered edges, and containing oppositely opening chambers working at different pressures and passages arranged substantially in the same plane for conducting air to said chambers.

9. A centrifugal multi-stage compressor comprising a plurality of rotatable impellers each having blades on opposite sides of the body, a shaft therefor, diaphragms between the impellers having shoulders on their outer edges and dished side faces forming lenticular chambers for said impellers, said faces acting to confine the fluid in the vane spaces of the impeller, nozzle rings, each of which is supported on the shoulders of two adjacent diaphragms at the circumference of said impeller chambers, partitions that divide the space between the nozzle rings into passages, passages in the diaphragms that convey fluid left and right to the adjacent impellers, a casing, and an inlet and an outlet for the casing.

10. A centrifugal air compressor, comprising a plurality of impellers, each having vanes on opposite sides, diaphragms containing passages for conveying air left and right to the centers of the adjacent impellers, a casing containing annular receivers to which air delivered by said impeller has unrestricted access, a plurality of circumferentially arranged ducts connected in parallel in the casing that are situated outside of the receivers and convey air from certain of said receivers to passages in the diaphragm, and an inlet and an outlet for the casing.

11. A centrifugal air compressor comprising a plurality of rotatable impellers, annular nozzles extending around the periphery of the impellers, chambers into which the nozzles deliver air, and diaphragms between each two impellers, each diaphragm having passages arranged in substantially the same plane that receive air from the chambers and delivering it to the inlets of the two impellers between which said diaphragm is arranged.

12. A centrifugal air compressor comprising a casing having an inlet and an outlet, diaphragms for dividing the casing into compartments, each diaphragm containing two sets of passages arranged in substantially the same plane, one set supplying fluid to the impeller on one side and the other set to the impeller on the other side and at a different pressure, and a double inlet impeller for each compartment, certain of said impellers receiving fluid from the passages in two adjacent diaphragms.

13. A centrifugal air compressor comprising a casing having an inlet and an outlet, diaphragms dividing the casing into compartments each of which is provided with sets of passages lying in substantially the same plane and opening left and right, an impeller for each compartment having vanes with passages between, a nozzle extending completely around the periphery of each impeller which is provided with vanes for reducing the velocity of the air delivered thereby, each of said nozzles being supported by two adjacent diaphragms, annular receivers that receive air from the nozzles and convey it directly to some of the passages in the diaphragm, and a plurality of circumferentially arranged ducts which convey air from around certain of the receivers and deliver it to passages in the diaphragms.

14. In an air compressor, the combination of a casing having an inlet and an outlet, diaphragms that divide the casing into compartments, an impeller for each compartment, an annular nozzle which surrounds each impeller, annular receivers which register with the nozzles and are formed in the casing, and passages in the diaphragms that are arranged in sets and in substantially the same plane, certain of those in one diaphragm coöperating with certain others in another diaphragm to supply air to the inlet of an impeller.

15. In an air compressor, the combination of a casing having an inlet, an outlet and a cylindrical bore, circular diaphragms that are fitted to said bore and divide the casing into compartments, each of said diaphragms being provided with chambers on opposite sides adjacent its center to which fluid under different pressures is admitted through passages in said diaphragms arranged in substantially the same plane, a packing carried by each diaphragm that coöperates with the rotating parts of the compressor to prevent fluid from one chamber entering the other, a nozzle for each impeller which reduces the velocity of the fluid discharged by it, and conduits that convey the fluid from the nozzles to the chambers in the diaphragms.

16. A centrifugal air compressor comprising a casing, impellers, a shaft on which the impellers are mounted, and diaphragms that divide the casing into compartments for the impellers, each of said diaphragms having two chambers surrounding the shaft, a wall between the chambers, and separate passages in the diaphragm leading from its outer portion to each chamber, said passages being arranged in substantially the same plane.

17. A centrifugal compressor comprising a casing, impellers, a shaft on which the impellers are mounted, diaphragms that divide the casing into compartments for the impellers, each diaphragm being provided with two chambers surrounding the shaft, a wall between the chambers, a packing between said wall and the shaft, outer walls, inner walls arranged in substantially parallel relation to each other and connected to the first wall, passages formed between the inner walls that lead from the outer portion of the diaphragm to the chambers, and cooling chambers formed between said inner and outer walls.

18. In a centrifugal apparatus, combination of a casing having an inlet and an outlet, diaphragms dividing the casing into compartments, which are provided with passages extending toward the impeller shaft and opening left and right at their inner ends, impellers in the compartments, a shaft therefor, an annular nozzle for each impeller, annular receivers registering with each nozzle which are provided with circumferentially arranged enlargements from which fluid flows directly to certain of the diaphragm passages, and circumferentially arranged ducts connected in parallel occupying positions between said enlargements and conveying fluid from receivers to other diaphragm passages.

In witness whereof, I have hereunto set my hand this ninth day of July, 1908.

RICHARD H. RICE.

Witnesses:
   JOHN A. MCMANUS, Jr.,
   HENRY O. WESTENDARP.